W. O. TAYLOR.
LET-OFF AND BRAKE CONTROLLING MECHANISM FOR KNITTING MACHINES.
APPLICATION FILED AUG. 29, 1916.

1,316,930.

Patented Sept. 23, 1919.
3 SHEETS—SHEET 1.

Inventor:
William O. Taylor,
by Jear. Middleton, Donaldson & Spear
Attys.

W. O. TAYLOR.
LET-OFF AND BRAKE CONTROLLING MECHANISM FOR KNITTING MACHINES.
APPLICATION FILED AUG. 29, 1916.

1,316,930.

Patented Sept. 23, 1919.

Inventor:
William O. Taylor.

W. O. TAYLOR.
LET-OFF AND BRAKE CONTROLLING MECHANISM FOR KNITTING MACHINES.
APPLICATION FILED AUG. 29, 1916.

1,316,930.

Patented Sept. 23, 1919.
3 SHEETS—SHEET 3.

Inventor:
William O. Taylor,
by Spear, Middleton, Donaldson & Spear
Attys.

UNITED STATES PATENT OFFICE.

WILLIAM O. TAYLOR, OF LIMERICK, PENNSYLVANIA, ASSIGNOR TO WILDMAN MFG. CO., OF NORRISTOWN, PENNSYLVANIA, A CORPORATION OF PENNSYLVANIA.

LET-OFF AND BRAKE-CONTROLLING MECHANISM FOR KNITTING-MACHINES.

1,316,930.  Specification of Letters Patent.  Patented Sept. 23, 1919.

Application filed August 29, 1916. Serial No. 117,491.

*To all whom it may concern:*

Be it known that I, WILLIAM O. TAYLOR, a citizen of the United States, and resident of Limerick, Pennsylvania, have invented certain new and useful Improvements in Let-Off and Brake-Controlling Mechanism for Knitting-Machines, of which the following is a specification.

The invention consists in the features and combination and arrangement of parts hereinafter described and particularly pointed out in the claims.

Features disclosed herein are also disclosed in applications filed by me August 29, 1916, No. 117,489 and 117,490.

In the accompanying drawings:

Figure 1 is a side view of the let-off mechanism and a portion of the knitting head.

Fig. 1ᵃ is a detail view.

One of the main purposes of this invention is to provide a power transmission controlling mechanism, or let-off, that will quickly stop the movement of the machine when a fault occurs in the yarn or fabric, and will prevent careless or inexperienced operators from starting the machine before correcting the fault and resetting the fault detectors, or stop motion devices, which initiated the arrest of the machine's movement. I have provided a form of let-off or transmission controller which not only stops the motion quickly by automatic means but prevents the premature starting of the machine during the time that the stop motion devices remain unset.

In carrying out the invention, I employ a series of mechanical actions, all controlled by a single hand lever, in such a way that the said actions must follow each other in a prescribed sequence in order to effect the starting of the machine. That is to say, one of these actions involves the resetting of the stop motion devices and the starting of the machine cannot take place until after this resetting action has been accomplished. In other words, the action for starting the machine is dependent upon the accomplishment of the actions involved in resetting the stop motion devices, so that until this resetting action takes place the starting action cannot take place.

My invention eliminates, to a large extent, the necessity for care on the operator's part and relieves the operator from unnecessary close attention in the handling of the machine, while, at the same time, preventing him from continuing the damage or faults by starting the machine prior to correcting the faults and resetting the stop motion.

While I have illustrated and described the let-off in connection with a tight and loose pulley, I do not limit myself to this particular form of drive, as other forms of driving means may be employed, for instance, a friction clutch may be used, such as shown in United States patent of Wildman and Loomis, No. 811,981, or a toothed clutch as shown in United States patent of Wilcomb, No. 1,054,479.

Any suitable stop motion mechanism can be used with my improved let-off, said stop motion including any suitable form of feelers or detectors for operating a main trip mechanism when the yarn fails, or when abnormal conditions exist in the knitting, and as these devices in their detail form may be of known construction and do not constitute a part of the present invention they are not illustrated herein. The main trip mechanism when operated by the said feeler or detector devices operates a rod 32.

Figure 7:
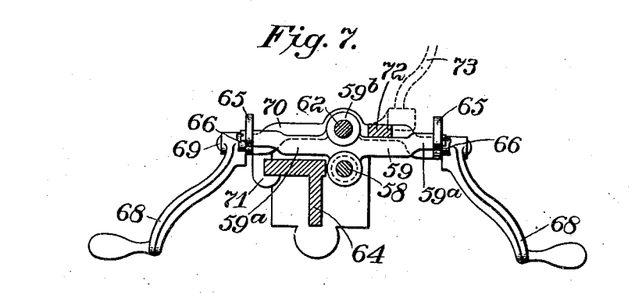
Fig. 7 is a transverse sectional view through parts of the let-off.

The rod 32 connects with the let-off mechanism through a supplemental trip arrangement which is supported at the top of a post 44 held in a bracket 45 secured to the base of the machine. This post supports at its upper end a plate or bracket 46 which forms the bearing for the upper end of a rod 47 adapted to turn, said rod carrying an arm 48 fixed thereto to which is adjustably connected a latch finger or arm 49 by a bolt and slot connection at 50. The latch finger 49 is held in normal position shown in Fig. 5 and also in Figs. 1 and 1ᵃ by a catch lever 51 pivoted to the plate 46 at 52 and having a shoulder 53 to engage the end of the latch arm 49. The rod 32 connects with this catch lever 51 and when the main trip mechanism at the knitting head is operated the catch 51 is withdrawn thus freeing the latch arm 49 so that the rock shaft or rod 47 may turn. This rock shaft at its lower end finds a bearing in one of the side frames 54 of the machine and it has attached thereto an arm 55 connected by a link 56 an arm 57 which is attached to a rod 58 slidably mounted in the side frame 54 and carrying a cross head 59. A spring 60 surrounding the rod 58 and bearing at one end against the side frame 54 and at its other end against the cross head 59 tends to move said rod toward the right from the position shown in Fig. 1 to the position shown in Fig. 2. The cross head 59 has an upper boss or collar 59$^b$ attached to an upper guide rod 62 which slides in bearings, one of which is shown at 63 on the bracket 64 attached to the side frame 54 and the other bearing in which the other end of its rod 62 slides is provided by the side frame 54 which has an opening through which the said rod passes. The cross head 59 has arms 59$^a$ extending on each side laterally therefrom and these are connected through curved links 65 to handles in the shape of bell crank levers having short arms 66 to which the said links are pivotally connected at 67. These hand levers are shown generally at 68 and they are fixed to a rock shaft or rod 69, one at each end thereof, said rock shaft finding bearings in a belt fork frame or cross head 70 which is slidably mounted on the rod 62 to have movement independent thereof, the said cross head 70 being also guided by a depending finger 71 thereof engaging the edge of the bracket 64 as shown in Fig. 7. This belt fork frame or cross head has an extension 72 carrying the belt fork members 73 and this end of the frame has engagement with the rod 62 to be guided thereby by an eye or collar 74 on said frame having an opening through which the rod 62 passes. This collar or boss 74 lies to one side of the boss or collar 59$^b$ of the cross head 59 before mentioned and therefore the spring 60 in pressing the cross head 59 to the right also acts to press the belt fork frame or cross heads 70 and 72 to the right when said spring is free to act.

Brake mechanism.

Figure 4:
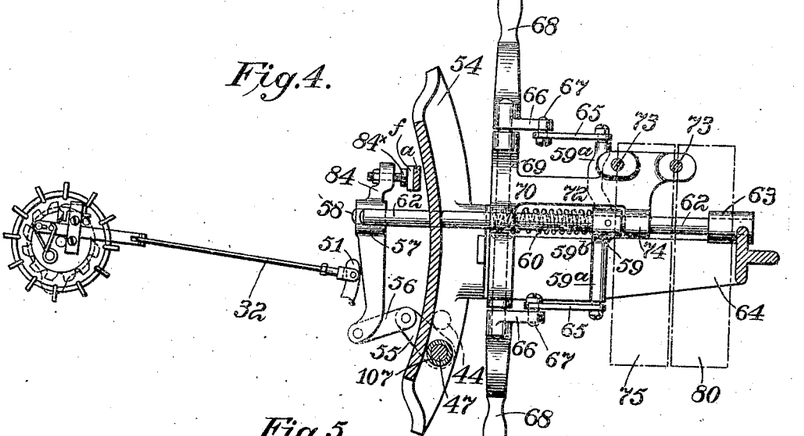
Fig. 4 is a plan view.

The fast driving pulley is shown at 75 suitably fixed to drive shaft 76 which turns in a bearing 77 of the side frame and a bracket bearing 77' and this shaft carries a beveled gear 78 on its inner end meshing with a beveled gear or rack 79 connected with the rotary member of the machine. The loose pulley is shown at 80 and a brake wheel or disk at 81 the latter being fixed to the shaft 76 and having an overhanging flange 82 against which the brake block 83 bears. The detail of this brake mechanism forms no part of my invention and it may be of any suitable form. I have provided novel means, however, for operating the brake mechanism consisting of an extension or finger 84 on the arm 57 which as the cross head 59 and belt fork frame 70, 72 moves toward the right in Figs. 1 and 4 will come against a rod $a$, Figs. 6 and 8 pivotally connected at $b$ to the hand lever $c$ connected with the brake block or shoe. The arm has a bolt head 84$^x$ as a contact member. This rod has notches $e$, $f$ and when the machine is running the rod is engaged by its upper notch $e$ with a fixed detent or bracket $g$ attached to the frame of the machine. The rod passes through an opening in this detent large enough to allow the rod to have lateral movement. It is held yieldingly by a spring $h$ in position to make the notch or lip $e$ engage the detent and hold the rod down and the brake off, but when the bolt head 84$^x$ of the arm 84 strikes the said rod at the time the let off cross head 59 moves to the right to shift the belt to the loose pulley in consequence of the pressure of spring 60, when the release of the supplemental trip mechanism takes place, the said rod will be pushed by the bolt head off from engagement with the lip of the bracket and said rod will no longer hold the brake off, but on the contrary the spring (not shown) in the brake mechanism will set the brake, the rod now offering no resistance to such action. The lower notch or lip $f$ of the rod $a$ is for the purpose hereinafter described.

Operation of let off.

Figures 1, 1A:
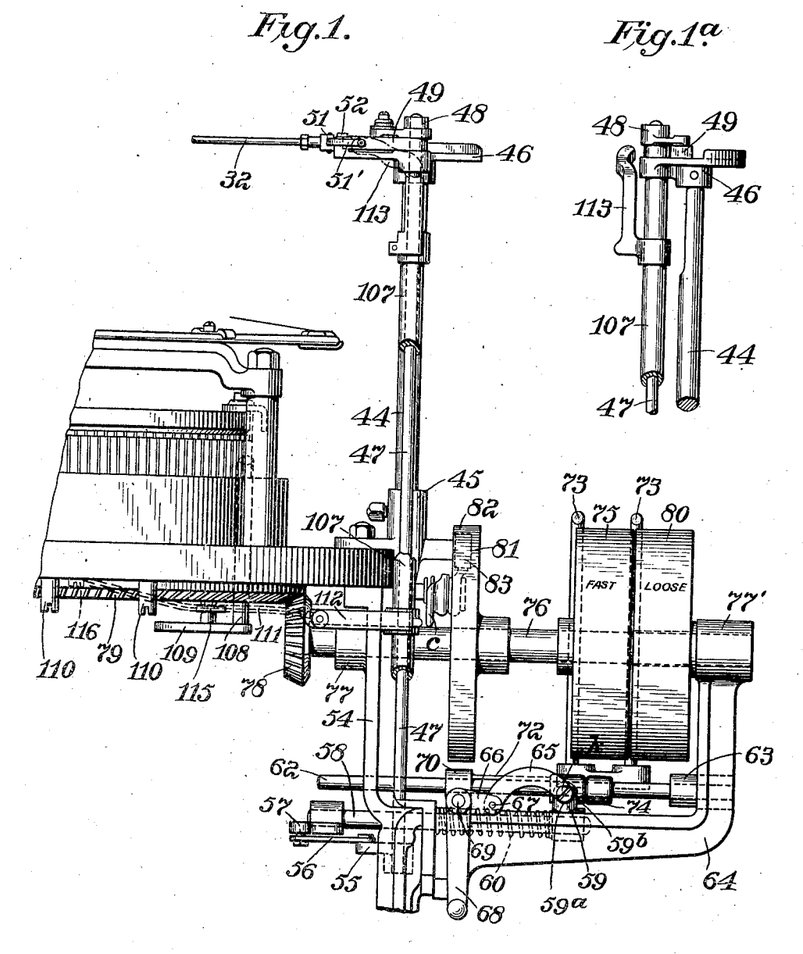
Figures 2, 3:
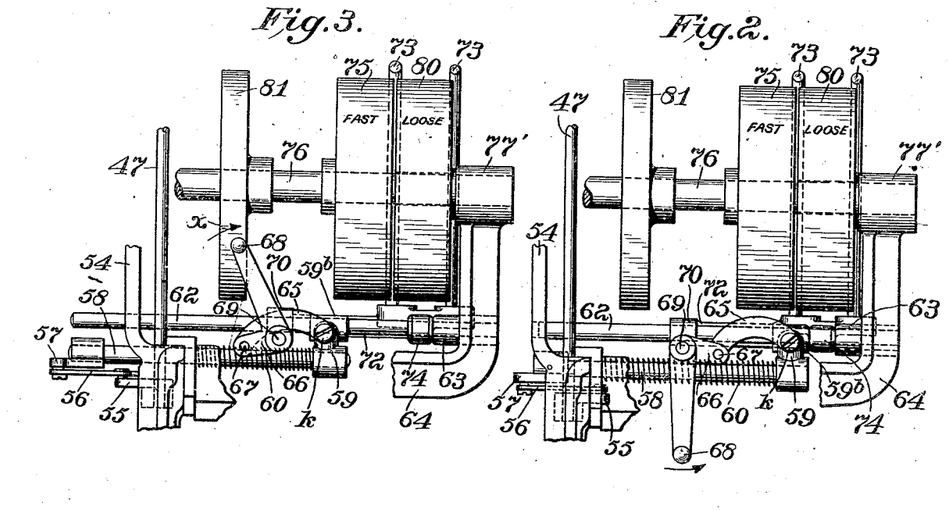
Figs. 2 and 3 are views of parts of the let-off mechanism showing the conditions at different periods of its operation.

On the operation of the trip mechanism 49, 51 the rod or shaft 47 will turn under the action of spring 60 of the sliding frame or cross head 59 which will shift the belt fork frame 70, 72 bodily with it while maintaining as a whole the relative position of Fig. 1, this movement being to the right, and thus the belt fork will be set in position to transfer the belt to the loose pulley 80, as shown in Fig. 2, thus stopping the machine, the brake being set as above described.

Now in starting the machine again after the yarn has been repaired or rethreaded and understanding that the let-off mechanism is in the position shown in Fig. 2, i. e., the position in which the machine is at rest, the first action is to turn the handle 68 in the arrow direction Fig. 2. As the fork frame 70, 72 is now at its extreme right hand limit with its boss 74 resting against the bearing 63 of the fixed bracket 64 and as the said handle is pivoted to said frame 70, 72 the turning of the handle in said arrow direction will draw upon the curved links 65 and the cross head 59 will be moved leftward including also the two rods 58, and 62 to which the cross head is connected and this movement will cause the arm 57 and the rod 58 to draw upon the link 56, thus turning the rod 47 and setting the latch finger 49 at the top thereof into engagement with the latch 51, which holds the parts in this set position, it being understood that the spring 60 by the action described has been compressed between the cross head 59 and the frame 54 ready to operate the let off when the catch is again released by the operation of the stop motion. The parts of the let off can not be reset or rather they will not be held in reset position unless the catch 51 is moved to position to retain the parts in place and this catch cannot be set in position without resetting the main trip mechanism in the head of the stop motion, and this main trip mechanism may be reset automatically or manually.

The position of the handle and other parts at the time the above resetting takes place is shown in Fig. 3 in which the handle has been raised and moved slightly beyond vertical position to the left, the fork carrying frame 70, 72 remaining stationary during this action, the links 65 drawing the setting cross head 59 forward until the handle assumes the position stated and thus the connections back to the trips are set. The belt shifting frame is locked in its idle position when the handle is in the position shown in Fig. 3 because the centers of the link 65 and the handle 68 are out of line. This is true also in Fig. 1, the fork frame being locked by the non-alined centers to hold the belt shifting frame with the belt in driving position.

Now in order to shift the belt the handle 68 is moved back to right Fig. 3, see arrow direction $x$ and as the cross head 59 already has been set to the left and latched by catch 51 above described the pivot $k$ becomes the fixed fulcrum in relation to which the movement takes place, this resulting in the parts assuming the position of Fig. 1 i. e., with the handle 68 pushed forward to the left by the straightening out of its arm 66 and link 65 and as the handle is pivoted to the forward end of the belt shifting frame 70, 72 this frame is drawn forward to the left to shift the belt onto the fast pulley.

It will be noticed that the belt fork is held against accidental displacement both when opposite the fast pulley for driving or when opposite the loose pulley for stopping, this being due to the center 67 being carried past the line cutting the pivot of the handle and the other pivot of the link.

A handle 68 is provided at each side of the let-off mechanism for convenience of control from either side of the machine. In order to operate the let-off when a bunch occurs at the needles, I provide a needle protector which operates through the stop motion connections above described. This needle protector consists of a finger and other parts substantially like those shown in Letters Patent of the United States, granted to Frank B. Wildman, No. 783,005, February 21, 1905, having a stem 108 which is lifted by a spring when the detector finger is moved by a bunch, broken needle or other obstruction near the knitting point. This post has a finger 109 which on the lifting of the post is brought into range of one of a number of pins 110 projecting down from the rotary part of the machine so that this finger will be struck and turned by one of said pins and thus through a chain 111 connected with the finger and with an arm 112 on the sleeve 107 surrounding the rod 47, said sleeve will be turned and through an arm 113 at its upper end and the tail 51' the latch or catch 51 will be tripped, the effect being the same as though the rod 32 were drawn upon by the trip mechanism i. e. the latch 49 will be released and the rod 47 will be allowed to turn by the spring 60 and the cross head 59 will slide, and said cross head acting against the boss 74 of the belt fork frame or slide 70, 72 will move the frame to the right to shift the belt onto the loose pulley. The chain 111 is attached to an arm 115 on the arm 109 and another section of this chain connects the said arm with a screw 116 on the base of the machine. This is for keeping the arm 109 in proper position to be struck by the pins 110.

It will be seen that a long turning movement of the handle 68 takes place in moving the cross head 59—61 from the position shown in Fig. 2 to that shown in Fig. 3 for compressing the spring 60 and as the necessary movement of the cross head is slight as compared with the long arc through which the handle swings ease of action results, so that the let off can be operated readily.

It will be seen from the above that by operating a single handle 68 the trip mechanism 49, 51 may be set and thereafter the belt may be shifted. For the first effect the handle 68 is moved from the position of Fig. 2 to the position of Fig. 3, which causes the shifting of the cross head 59 from the position of Fig. 2 leftward to the position of Fig. 3 the belt fork frame 70, 72 remaining stationary and acting as the fulcrum for this movement of the cross head 59. This movement of said cross head 59 sets the trip and as this locks the cross head in its leftward position the operation of the handle 68 from the position of Fig. 3 to that of Fig. 1 in the direction of the arrow draws to the left the belt fork frame 70, 72, the cross head 59 now acting as the fulcrum point and the belt is shifted onto the fast pulley.

Figures 5, 6, 8:
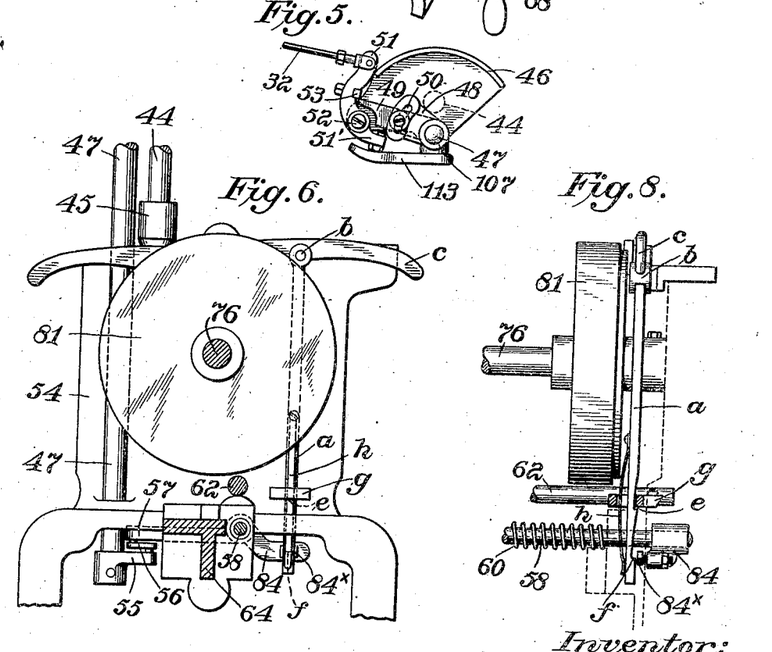
Fig. 5 is a plan view of a secondary trip mechanism.
Fig. 6 is a sectional view showing the brake controlling mechanism.
Fig. 8 is a view of the brake wheel and operating connections for the brake.

Reverting to the trip mechanism at the upper end of the post 44 it will be seen from Fig. 5 that the catch 51 has an extension 51' beyond its pivot having a screw or pin carried thereby and the purpose of this is to automatically reset the trip mechanism in the head of the stop motion mechanism automatically when the latch arm 49 has swung to the left into the position shown in Fig. 5, for then the said latch arm will strike the end of the pin in the end of the arm 51' and will swing the catch 51 on its pivot 52 to bring it into the position shown in Fig. 5, so that the shoulder 53 will engage and hold the latch 49 This same movement of the catch 51, imparted to it through the resetting of the arm 49, to the position shown will draw upon the links 32 and automatically reset the main trip mechanism at the stop motion head.

*Brake operating mechanism for let off.*

To enable the operator to set the brake under different conditions in respect to the position of the let off mechanism I employ the rod *a* depending from the handle *c* of the brake mechanism, said rod having the lower notch *f* which will be engaged by the bolt head 84ˣ on the arm 84 should the parts of the let off mechanism be in the let off position with the belt on the loose pulley. Should the parts be in this position the operator can still take off the brake or rather adjust and hold it ready to operate by simply depressing the right hand handle *c*, Fig. 6.

Now should the operator as described above have first adjusted the brake ready to act and afterward operated or set the let off mechanism ready to act, his first operation will be to move the cross head 59 toward the left in Fig. 3 or toward the machine, this movement being necessary in order to set the supplemental trip. The effect of this will be to withdraw the bolt of the arm 84 from the low notch *f* in the depending rod with the result that said rod will move up under the action of the spring in the brake mechanism, but the movement will be arrested before the brake is thrown in far enough to have any effect on the running of the machine, or in other words, the brake still will be entirely off. This effect is due to the upper notch in the depending bar catching on the lower edge of the guide piece or detent *g*, the leaf spring of course keeping the rod pressed into such a position that this engagement is sure to take place. The let off mechanism can now be further set by moving the belt frame 70, 72 by the described further movement of the hand lever 68 and the whole apparatus including the let off and the brake will now be ready for operation in case the stop motion operates. When this occurs the bolt head 84ˣ in arm 84 when the cross head 59 moves to the right to release the trip mechanism will strike the lower end of the depending rod and thereby release its upper shoulder or notch from the lower edge of the guide or detent *g* and the rod will no longer exercise any restraint on the brake mechanism, which will, therefore, be set at the same time that the let-off is operated.

Of course, it will be understood that the brake can be released and set ready for action after the let-off handle has been operated to set the trip mechanism and shift the belt, for when the trip is set the cross head 59 is, as before described, moved toward the left, Fig. 2, the bolt head 84ˣ being thereby withdrawn from the path of the rod and allowing the rod to be engaged by its upper notch with the bracket or detent *g*.

It will be seen from the above that the stop motion is reset and thereafter the machine is started and these two actions are accomplished by manipulating a single hand lever.

In the appended claims, for purpose of identification, I have referred to the belt fork carrying member 70, 72 as a drive setting member, and the cross head 59 as the trip controlled member. These terms, however, are merely employed for convenience of identification in the claims, and it will be understood that their employment in no way is to be construed in connection with the present statement as limiting the structure or arrangement of these elements to the forms or arrangements illustrated in the drawings, as equivalent forms and arrangements may be employed and still come within the terms of the claims and the spirit of the invention.

What I claim as my invention is:—

1. In combination in a knitting machine, a yarn controlled stop motion, a machine driving means, trip connections between the stop motion and the driving means to stop the machine when a fault in the knitting occurs, a single hand operated lever for resetting the trip connections and for setting the driving means for driving the machine, said hand operated lever having a two step action for performing the resetting of the trip mechanism and the setting of the driving means, one of these step movements being in one direction and the other in another direction, substantially as described.

2. In combination in a knitting machine, a yarn controlled stop motion, a machine driving means, trip connections between the stop motion and the driving means to stop the machine when a fault in the knitting occurs, a single hand operated lever for resetting the trip connections and for setting the driving means for driving the machine, said hand operated lever having a two step action for performing the resetting of the trip mechanism and the setting of the driving means, one of these step movements being in one direction and the other in another direction, the effectiveness of the second step in starting the machine being dependent upon the effectiveness of the first step in resetting the stop motion, substantially as described.

3. In combination in a knitting machine, a stop motion, driving means, connections between the stop motion and driving means for stopping the machine, hand operated means for resetting the stop motion by a single movement in one direction of said hand operated means, a connection between the hand operated means and the driving means to set the same for driving when the hand operated means is given a reversed movement to that first mentioned, said reversed movement being effective in setting the driving means only after the stop motion has been reset, substantially as described.

4. In combination in a let-off mechanism for knitting machines, driving means to be set in position for driving or stopping, a shiftable drive setting member connected with the said driving means, trip mechanism, controlling means for said trip mechanism, connections controlled by said trip mechanism, a spring exerting its force upon said connections when held by said trip mechanism, a handle movably mounted on the said shiftable drive setting member and connected with said connections to set the same to be held by the trip mechanism and place the spring under tension, the further movement of said handle, when the said connections have been set thereby and held by the trip, serving to move the shiftable drive setting member to set the drive for starting the machine.

5. In combination trip mechanism, a shifting member to set the same, driving means for the machine, a shifting controlling member for the drive, spring means for applying tension to said members, and a single hand operated device connected to both of said members operating the trip setting member first, said trip setting member then becoming fixed, and thereafter operating the second member to start the machine, said hand device in said action finding a fulcrum on said fixed trip setting member, substantially as described.

6. In combination in a let off mechanism for knitting machines, trip mechanism, a shiftable member connected with the trip mechanism, a drive controlling member shiftable for putting the drive on or off, a single operating device with pivotal connections between the same and both of said members, a single spring for forcing the said members one way to let off position and a frame-bearing against which the drive controlling member rests when in let-off position, said hand operating device first finding a fulcrum on the drive controlling member when the latter is resting against the frame bearing while the other pivotal connection moves to operate the shiftable member first mentioned against the spring pressure setting the trip, said pivotal connection then becoming a fixed fulcrum point for moving the drive controlling member in the further movement of said hand device, substantially as described.

7. In combination in a let-off mechanism for knitting machines, a drive means to be set in position for driving or stopping the machine, a trip mechanism, a shiftable member, a connection from said member to the trip mechanism, a spring for placing said connection and member under stress when set, and means connecting the said drive means and shifting member and pivoted to each, said connecting means being operated by hand to first move the said shifting member to place the spring under stress and set the connections to be held by the trip mechanism and then to set the drive means into position for starting and driving the machine, said connecting means finding a fulcrum first on said drive means and then on the shiftable member, each of said fulcrums being movable while the other is stationary.

8. In combination in a let-off mechanism for knitting machines, drive means to be set in position for driving or stopping the machine, a shiftable drive setting member to set the drive means in one direction or the other, a trip mechanism, a shifting member controlled by the trip mechanism, a spring for placing said member under stress when held by said trip mechanism, said shifting member, when released from said trip mechanism and operated by said spring, serving to operate the shiftable drive setting member, a pivotally mounted hand lever on the shiftable drive setting member and a connection between said lever and the said shifting member, said handle when turned first moving the shifting member to be held by the trip mechanism and place the spring under stress and then shifting the drive setting member in position to start and drive the machine, substantially as described.

9. In combination in a let-off mechanism for knitting machines, drive means to be set in position for driving or stopping the machine, a movable drive setting member to set the drive in either one position or the other, a shifting member, trip mechanism, means for controlling said trip mechanism, a connection between said trip mechanism and said shifting member, said shifting member, when released from said trip mechanism and under the force of said spring, serving to actuate the movable drive setting member to set the drive means in position for stopping the machine, a pivoted handle mounted on the movable drive setting member and a link connection between said handle and the trip controlled shifting member, substantially as described.

10. In combination in a let-off mechanism for knitting machines, drive means to be set in position for driving or stopping the machine, a movable drive setting member to set the driving means for running or stopping the machine, trip mechanism, a shifting trip controlled member with connections between the same and said trip mechanism, a spring which is placed under tension when said shifting trip controlled member is held by said trip mechanism, said trip controlled member, when released, effecting the operation of the movable drive setting member to set the driving means for stopping the machine, a handle in the form of a bell crank lever pivotally mounted on the said movable drive setting member and a link connecting one arm of said bell crank lever with the shifting trip controlled member, substantially as described.

11. In combination in a let-off mechanism for knitting machines, drive means to be set in position for driving or stopping the machine, a movable setting member for the driving means to set the same in position for driving or stopping, a shifting trip controlled member adjacent said drive setting member, a spring for placing said trip controlled member under stress, said trip controlled member, when moved by said spring, operating the drive setting member to set the same in position for stopping the machine, a stop against which said movable drive setting member rests when the driving means is in stopping position, manually operated means for shifting the movable drive setting member and the shiftable trip controlled member, trip means for holding the said trip controlled member with the spring under stress, said manually operated means, when operated, finding a fixed fulcrum, first on the movable drive setting member, which is now at rest, to thereby shift the trip controlled member to be held by the trip mechanism, and thereafter finding a fixed fulcrum on the trip controlled member which is now held stationary by the trip mechanism to thereby cause a shifting movement of the drive setting member as the movement of said manually operated means is continued, substantially as described.

12. In combination in a let-off mechanism for knitting machines, drive means to be set in position for running or stopping the machine, a movable drive setting member, a trip controlled shifting member, trip mechanism, a connection between said trip mechanism and said member controlled thereby, a spring for placing said trip controlled member under stress, a hand lever pivotally mounted on the movable drive setting member, a connection between said hand lever and the said trip controlled member, said hand lever, when moved in one direction, causing the movement of the trip controlled member to be locked by said trip controlled mechanism and to place the spring under stress while the movable drive setting member remains at rest, and the return movement of said hand lever serving to actuate the movable drive setting member while the trip controlled member remains locked by the trip mechanism, said trip controlled member, when released, actuating the drive setting member to adjust the driving means to stop the machine, substantially as described.

13. In combination in a let-off mechanism for knitting machines, drive means to be set in position for driving or stopping the machine, a movable drive setting member, a shiftable trip controlled member, trip mechanism, a connection between said trip mechanism and said shiftable member, a spring under stress when said shiftable member is held by said trip mechanism, said shiftable member, when released, operating the movable drive setting member to set the drive in position for stopping the machine, a hand lever pivotally mounted on the movable drive setting member, said hand lever being in the form of a bell crank, a link connecting the short arm of the bell crank with the shiftable trip controlled member, said hand lever, when turned in one direction, serving to move the shiftable member to be held by the trip mechanism and place the spring under tension, the movable drive setting member, with its pivot for the hand lever, then remaining at rest, the return movement of said hand lever in the opposite direction straightening out said link and short arm of the bell crank lever to thereby shift the pivot of the arm, together with the movable drive setting member, which carries said pivot, in relation to the trip controlled member to which the link is pivoted and which is now stationary, substantially as described.

14. In combination in a let-off mechanism for knitting machines, drive means to be set in position either for stopping or starting the machine, a movable drive setting frame connected with the drive means to set it in either one position or the other, a shiftable trip controlled member, a trip mechanism for holding said member, a spring placing said member under stress when held by said trip mechanism, a bell crank lever pivotally mounted on the movable drive setting frame, a link connecting an arm of said bell crank lever with the shiftable trip controlled member, the handle end of said bell crank lever extending downwardly when the let-off is in position to hold the driving means in stopping position and the short arm of said bell crank lever, together with the link connected thereto, being substantially straightened out, a stop against which the movable drive setting frame bears when the driving means is in stopping position, said handle being adapted to be turned to a position lying substantially over its pivot to thereby pull upon the link and move the trip controlled member into position to be held by the trip mechanism and place the spring under stress, the relative position of the pivots of the link and of the hand lever being such that the parts will be locked in this position, said hand lever, when turned in the opposite direction from its uppermost to its lowermost position, working through the link against the pivot on the trip controlled member which is now held fixed by the trip mechanism and thereby moving the pivot of the hand lever, together with the drive setting member, in relation to the shiftable trip controlled member by the straightening out action of the link and arm of the bell crank lever to thereby set the driving means in driving position, said trip controlled member, when released by the trip mechanism and under tension of the spring, shifting the drive setting member to set the driving means in stopping position, substantially as described.

15. In combination in a let-off mechanism for knitting machines, drive means to be set in position for driving or stopping the machine, a movable drive setting frame for setting the driving means in either one of its positions, a bell crank lever at each side of said drive setting frame, a shiftable trip controlled member, trip mechanism, a connection between said trip mechanism and said shiftable member, a spring for placing said shiftable member under stress to move the same when released by the trip mechanism, said shiftable member acting upon the movable drive setting frame to set the driving means in stopping position, a link at each side of and connected to the shiftable trip controlled member and connected with the bell crank hand levers, and stop means, against which the movable drive setting member rests when the driving means is in stopping position.

16. In combination, drive means to be set in position for driving or stopping the machine, two members movably mounted, one member being connected to the driving means to set the same in either of its positions for driving or stopping the machine, and the other member being trip controlled, said members being relatively movable and also movable in unison, a spring, under power of which both members are moved in setting the driving means in stopping position, trip mechanism and manually operated connections between the two movable members for first moving the shiftable trip controlled member to be held by the trip mechanism, which member then acts as a fulcrum support for said connections in moving the drive setting member in relation to the trip controlled member to thereby set the driving means in position for driving the machine, substantially as described.

17. In combination, drive means to be set in position for driving or stopping the machine, two members movably mounted, one member being connected to the driving means to set the same in either of its positions for driving or stopping the machine, and the other member being trip controlled, said members being relatively movable and also movable in unison, a spring, under power of which both members are moved in setting the driving means in stopping position, trip mechanism and manually operated connections between the two movable members for first moving the shiftable trip controlled member to be held by the trip mechanism, which member then acts as a fulcrum support for said connections in moving the drive setting member in relation to the trip controlled member to thereby set the driving means in position for driving the machine, said connections locking the drive setting member against accidental displacement, substantially as described.

18. In combination, drive means to be set in position either for stopping or driving the machine, two members movably mounted and movable relatively to each other, one of said members being connected with the drive means to set the same in position for driving or stopping the machine and the other of said members being trip controlled, trip mechanism, hand operated connections between the two members to move one member and connected to both to be held by the trip mechanism and thereafter when the trip controlled member becomes set to move the drive setting member to set the driving means in driving position and spring means for operating said members when the trip mechanism is operated to set the driving means in stopping position, the operation of the drive setting member being dependent on the setting of the trip controlled member, substantially as described.

19. In combination, drive means to be set in position either for stopping or driving the machine, trip mechanism, two movable members, one connected with the driving means for setting the same in either of its positions and the other being shiftable to be held by the trip mechanism, said members being actuated by hand operated means, which, when operated, first shifts the trip controlled member to be held by the trip and thereafter by said hand operated means then finding a fixed fulcrum on the trip held member and by a further movement of said hand operated means, the drive setting member is operated to set the driving means in position for driving the machine, and an operating spring, the operation of the drive setting member being dependent upon the setting of the trip controlled member first, substantially as described.

20. In combination, drive means to be set in position for stopping or starting the machine, trip mechanism, a shiftable member to be held by said trip mechanism, a movable member connected to the drive means for setting the same, hand operated connections between the members, the said drive setting member acting as a fulcrum support for the hand operated connections when operated to move the trip controlled member to be held by the trip mechanism and the said trip controlled member acting as the fulcrum support when held by the trip mechanism and when the connections are given a further movement to operate the drive setting member to drive the machine, substantially as described.

21. In combination, let-off mechanism, a frame member, brake means, and detent means connected with the brake mechanism and set in either of two positions to hold the brake off, i. e., in engagement with the frame member, or in engagement with a part of the operated let-off means, said detent being released from the frame member by the movement of the let-off mechanism in stopping the machine and released from engagement with the let-off mechanism when the same is reset to automatically engage the frame member until operated by the let-off, substantially as described.

22. In combination, let-off mechanism, a frame member, brake means, a detent rod for holding the brake off, having two detent teeth, one for engaging the frame member and the other for engaging a part of the let-off mechanism when in operated position, said detent, when the let-off is reset, engaging the frame member automatically and being released therefrom to set the brake when the let-off is operated to stop the machine.

23. In combination, a frame, having a detent, a let-off mechanism, and brake mechanism including movable detent means for holding the brake off, said brake mechanism with its detent being set and held by the detent with the brake off either when the let-off is set or released, the detent in the first mentioned case engaging the frame detent and in the second case engaging a part of the let off, said movable detent being released from the frame detent by contact of said part of the let off, when the latter operates to stop the machine.

WILLIAM O. TAYLOR.